United States Patent
Park et al.

(10) Patent No.: US 10,164,803 B2
(45) Date of Patent: Dec. 25, 2018

(54) METHOD AND APPARATUS FOR CONTROLLING INTERFERENCE IN QAM-FBMC SYSTEM

(71) Applicant: KOREA ADVANCED INSTITUTE OF SCIENCE AND TECHNOLOGY, Daejeon (KR)

(72) Inventors: Hyuncheol Park, Daejeon (KR); Hyungsik Han, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/359,117

(22) Filed: Nov. 22, 2016

(65) Prior Publication Data

US 2017/0359204 A1 Dec. 14, 2017

(30) Foreign Application Priority Data

Jun. 10, 2016 (KR) ........................ 10-2016-0072672

(51) Int. Cl.
*H03C 1/04* (2006.01)
*H03D 1/06* (2006.01)
(Continued)

(52) U.S. Cl.
CPC ...... *H04L 25/03057* (2013.01); *H04L 27/264* (2013.01); *H04L 27/2649* (2013.01); *H04L 27/34* (2013.01); *H04L 27/2698* (2013.01)

(58) Field of Classification Search
USPC ................ 375/219, 220, 221, 222, 229–236, 375/240.26–240.27, 240, 240.02–240.07,
(Continued)

(56) References Cited

U.S. PATENT DOCUMENTS 6,360,369 B1 * 3/2002 Mahoney ............. H04B 1/1036
348/E5.003
6,366,613 B2 * 4/2002 Sommer ............. H03H 21/0012
333/28 R
(Continued)

FOREIGN PATENT DOCUMENTS

| KR | 10-0560627 B1 | 3/2006 |
| KR | 10-1335898 B1 | 12/2013 |
| KR | 10-2014-0097074 A | 8/2014 |

OTHER PUBLICATIONS

Bellanger et al., "FBMC physical layer : a primer," *Physical Layer for Dynamic Spectrum Access and Cognitive Radio*, Jun. 2010, 16 pages.

(Continued)

*Primary Examiner* — Linda Wong
(74) *Attorney, Agent, or Firm* — Seed IP Law Group LLP

(57) ABSTRACT

Disclosed are a method and an apparatus for controlling a quadrature amplitude modulation-filter bank multi-carrier (QAM-FBMC) system. A method of controlling interference is performed by a reception apparatus of the QAM-FBMC system, wherein the reception apparatus is paired with a transmission apparatus. The method includes receiving a pre-coded data symbol; and removing residual interference caused due to a non-orthogonal filter from the pre-coded data symbol by using a decision feedback equalizer.

16 Claims, 5 Drawing Sheets

(51) Int. Cl.
*H04B 1/10* (2006.01)
*H04L 25/08* (2006.01)
*H04L 25/03* (2006.01)
*H04L 27/26* (2006.01)
*H04L 27/34* (2006.01)

(58) Field of Classification Search
USPC ....... 375/254, 259, 261, 268, 271, 278, 285, 375/284, 295, 298, 300, 302, 316, 320, 375/322, 324, 340, 346–348, 350, 356
See application file for complete search history.

(56) References Cited

U.S. PATENT DOCUMENTS

| | | | | |
|---|---|---|---|---|
| 7,706,437 | B2* | 4/2010 | Saed | H04L 25/03159 375/229 |
| RE42,317 | E* | 5/2011 | Al-Dhahir | H04N 5/211 348/607 |
| 8,345,793 | B2* | 1/2013 | Dent | H04L 25/03343 375/260 |
| 8,457,254 | B2* | 6/2013 | Khayrallah | H04L 25/03012 375/340 |
| 8,687,720 | B2* | 4/2014 | Berg | H04L 25/022 375/259 |
| 9,088,400 | B2* | 7/2015 | Eliaz | H04L 25/03242 |
| 9,654,192 | B2* | 5/2017 | Yu | H04B 7/0452 |
| 2002/0181572 | A1* | 12/2002 | Meehan | H04B 7/0845 375/229 |
| 2005/0025229 | A1* | 2/2005 | Jones | H04L 25/03146 375/232 |
| 2009/0213907 | A1* | 8/2009 | Bottomley | H04L 25/03203 375/148 |
| 2009/0262694 | A1* | 10/2009 | Lee | H04B 7/0621 370/329 |
| 2010/0266061 | A1* | 10/2010 | Cheng | H04B 7/0617 375/267 |
| 2011/0038435 | A1* | 2/2011 | Omidi | H04L 25/03343 375/260 |
| 2011/0286502 | A1* | 11/2011 | Adachi | H04L 25/0242 375/219 |
| 2013/0022097 | A1* | 1/2013 | Hewavithana | H04L 25/022 375/232 |
| 2013/0279557 | A1* | 10/2013 | Kolze | H04L 25/03019 375/227 |
| 2014/0241471 | A1* | 8/2014 | Orlik | H04L 1/0054 375/341 |
| 2015/0172079 | A1* | 6/2015 | Eliaz | H04L 25/03178 375/285 |
| 2015/0349996 | A1* | 12/2015 | Vilaipornsawai | H04L 27/2607 375/295 |
| 2016/0218781 | A1* | 7/2016 | Seifert | H04B 7/0417 |
| 2017/0134203 | A1* | 5/2017 | Zhu | H04B 7/0456 |
| 2017/0257249 | A1* | 9/2017 | Hong | H04L 5/0048 |
| 2017/0272281 | A1* | 9/2017 | Kim | H04J 11/0036 |
| 2017/0272293 | A1* | 9/2017 | Nam | H04L 27/26 |
| 2018/0019905 | A1* | 1/2018 | Zhu | H04B 7/0452 |
| 2018/0035179 | A1* | 2/2018 | Lee | H04W 72/04 |

OTHER PUBLICATIONS

Korean Office Action dated Jun. 1, 2017 for corresponding KR Application No. 10-2016-0072672, 7 pages.

* cited by examiner

METHOD AND APPARATUS FOR CONTROLLING INTERFERENCE IN QAM-FBMC SYSTEM

CROSS-REFERENCE TO RELATED APPLICATIONS

A claim for priority under 35 U.S.C. § 119 is made to Korean Patent Application No. 10-2016-0072672 filed Jun. 10, 2016, in the Korean Intellectual Property Office, the entire contents of which are hereby incorporated by reference.

BACKGROUND

Embodiments of the inventive concept described herein relate to a technique for removing residual interference caused by a non-orthogonal filter in a quadrature amplitude modulation-filter bank multi-carrier (QAM-FBMC) system.

Cyclic Prefix-Orthogonal Frequency Division Multiplexing (CP-OFDM) is a technique that may be easily applied to very many applications such as LTE, Wi-Fi and the like and may easily employ complex signal processing such as a multi-input multi-output (MIMO) technique.

However, the CP-OFDM has a high out-of-band emission property in a frequency domain due to a rectangular waveform symbol, so that the frequency limitation property is bad. Thus, due to the bad frequency limitation property, in case of LTE, a quite number of guard bands are used so that the bandwidth efficiency is deteriorated.

In addition, since CP is used to prevent an orthogonality loss due to the inter symbol interference (ISI) of an OFDM system, a loss is forced even on a time axis. The CP-OFDM property does not meet the flexibility required in next generation wireless communication environment. Specifically, the OFDM system of which the time and frequency localization properties are insufficient cannot avoid a loss in orthogonality in an asynchronous environment such as narrowband-Internet of things (NB-IoT). Thus, there is required a new technique which can meet both the time and frequency localization properties and orthogonality.

As one technique proposed to overcome the defects of CP-OFDM, there has existed OQAM-FBMC. The FBMC is a technique that improves the frequency limitation property by applying filters to sub-carriers, respectively and enables a flexible waveform design to meet various scenarios. Specifically, the OQAM-FBMC achieves orthogonality on a real axis by using the OQAM modulation so that the OQAM-FBMC is almost similar to the OFDM in terms of performance. When a symbol experiences a real complex channel and a MIMO scheme is applied, the residual interference of an imaginary part is introduced so that the orthogonality on a real axis is damaged. A scheme of solving the problems caused due to the residual interference is required in the OQAM-FBMC. Thus, in recent years, there has been proposed a QAM-FBMC scheme for solving the problems. There has been proposed a QAM-FBMC filter design to sufficiently meet generalized Nyquist condition through the global optimization of a filter factor. Since there is a trade-off between the filter orthogonality and the frequency limitation property, it is impossible to meet the filter orthogonality and the frequency reduction rate in the filter design. Although a certain degree of orthogonality and a high frequency limitation property are guaranteed by applying a specific filter to the QAM-FBMC system, since the filter does not have perfect orthogonality, so that the performance is limited due to the residual interference component.

Therefore, a technique of effectively removing the residual interference of a non-orthogonal filter in QAM-FBMC is required.

SUMMARY

Embodiments of the inventive concept provide techniques of removing residual interference caused by a non-orthogonal filter (or approximate to orthogonality) in a QAM-FBMC system, and more particularly, techniques of reducing or removing the residual interference based on spectral factorization and a decision feedback equalizer.

In addition, embodiments of the inventive concept provide techniques of more effectively reducing or removing the residual interference of a filter by calculating a pre-coding filter for removing the residual interference through spectral factorization.

According to an aspect of an embodiment, a method of controlling interference, which is performed by a reception apparatus of a quadrature amplitude modulation-filter bank multi-carrier (QAM-FBMC) system, wherein the reception apparatus is paired with a transmission apparatus. The method includes: receiving a pre-coded data symbol; and removing residual interference caused due to a non-orthogonal filter from the pre-coded data symbol by using a decision feedback equalizer.

The removing of the residual interference may include removing the residual interference from the pre-coded data symbol based on a feed-forward filter calculated through spectral factorization.

The removing of the residual interference may include performing sequential feedback detection such that a system response is causally transformed as the received data symbol passes through the feed-forward filter.

The feed-forward filter may be calculated by decomposing a system matrix (R(z)), which is obtained by modeling a relation between a transmission vector and a reception vector of the data symbol into a matrix polynomial in z domain, into a unitary matrix and a diagonal matrix, and spectrally factorizing the diagonal matrix.

The system matrix may include a para-hermitian matrix property.

The removing of the residual interference may include feeding back the detected data symbol to an output terminal of a feed-forward filter based on a feedback filter calculated through spectral factorization, and removing the residual interference from the received data symbol based on the feed-backed data symbol.

The pre-coded data symbol may be obtained by precoding a data symbol based on a precoding filter calculated through spectral factorization and delay-aligned through the receiving of the pre-coded data symbol.

According to another aspect of an embodiment, a quadrature amplitude modulation-filter bank multi-carrier (QAM-FBMC) system includes: a data reception unit configured to receive a pre-coded data symbol; and an interference removal unit configured to remove residual interference caused due to a non-orthogonal filter from the pre-coded data symbol by using a decision feedback equalizer.

The interference removal unit may remove the residual interference from the pre-coded data symbol based on a feed-forward filter calculated through spectral factorization.

The feed-forward filter may be calculated by decomposing a system matrix (R(z)), which is obtained by modeling a relation between a transmission vector and a reception vector of the data symbol into a matrix polynomial in z domain, into a unitary matrix and a diagonal matrix, and spectrally factorizing the diagonal matrix.

The system matrix may include a para-hermitian matrix property.

The interference removal unit may feed the detected data symbol back to an output terminal of a feed-forward filter based on a feedback filter calculated through spectral factorization, and may remove the residual interference from the received data symbol based on the feed-backed data symbol.

The pre-coded data symbol may be obtained by precoding a data symbol based on a precoding filter calculated through spectral factorization and delay-aligned through the receiving of the pre-coded data symbol.

According to still another aspect of an embodiment, a method of controlling interference, which is performed by a reception apparatus of a quadrature amplitude modulation-filter bank multi-carrier (QAM-FBMC) system, wherein the reception apparatus is paired with a transmission apparatus. The method includes: pre-coding a data symbol based on a feed-forward filter calculated through spectral factorization; and transmitting the pre-coded data symbol to the reception apparatus, wherein a system matrix having a para-hermitian matrix property is applied to the pre-coded data symbol.

The pre-coding filter may be calculated by decomposing the system matrix into a unitary matrix and a diagonal matrix and spectrally factorizing the diagonal matrix.

The filter residual interference may be a property of QAM-FBMC, may be generated as the data symbols overlap each other, and may be removed based on a pre-coding filter, a feed-forward filter and a feed-back filter which are calculated through the spectral factorization.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments of the inventive concept will be described in detail with reference to accompanying drawings.

Embodiments of the inventive concept relate to successive interference cancellation that successively removes or reduces interference in a QAM-FBMC system by using a decision feedback equalizer using spectral factorization in MIMO communication. In the QAMM-FBMC system, the interference caused by a filter exerts an influence on other subcarriers and other adjacent symbols. Embodiments of the inventive concept relates to techniques that remove or reduce the interference by using a system matrix modeled as a para-hemitian matrix type of a system transfer function in an end-to-end discrete symbol system. Specifically, embodiments of the inventive concept relate to techniques that remove or reduce residual interference caused due to several filters in QAM-FBMC by using spectral factorization.

Embodiments of the inventive concept provide structures of precoding and decision feedback equalizers for reducing or removing residual interference caused due to a non-orthogonal (approximate orthogonal) filter.

In the disclosure, a QAM-FBMC system includes a transmission apparatus and a reception apparatus which are paired with each other. In addition, in the QAM-FBMC system, a data symbol pre-coded in the transmission apparatus may be transmitted to the reception apparatus and an original signal may be detected by removing residual interference from the data symbol received at the reception apparatus.

Specifically, embodiments of the inventive concept relates to a technique which removes interference to, the QAM-FBMC system relates to a scheme that removes interfere to successively detect data symbols by transforming a non-causal state of a system response into a causal state based on a feed forward filter in a QAM-FBMC system.

Figure 1:
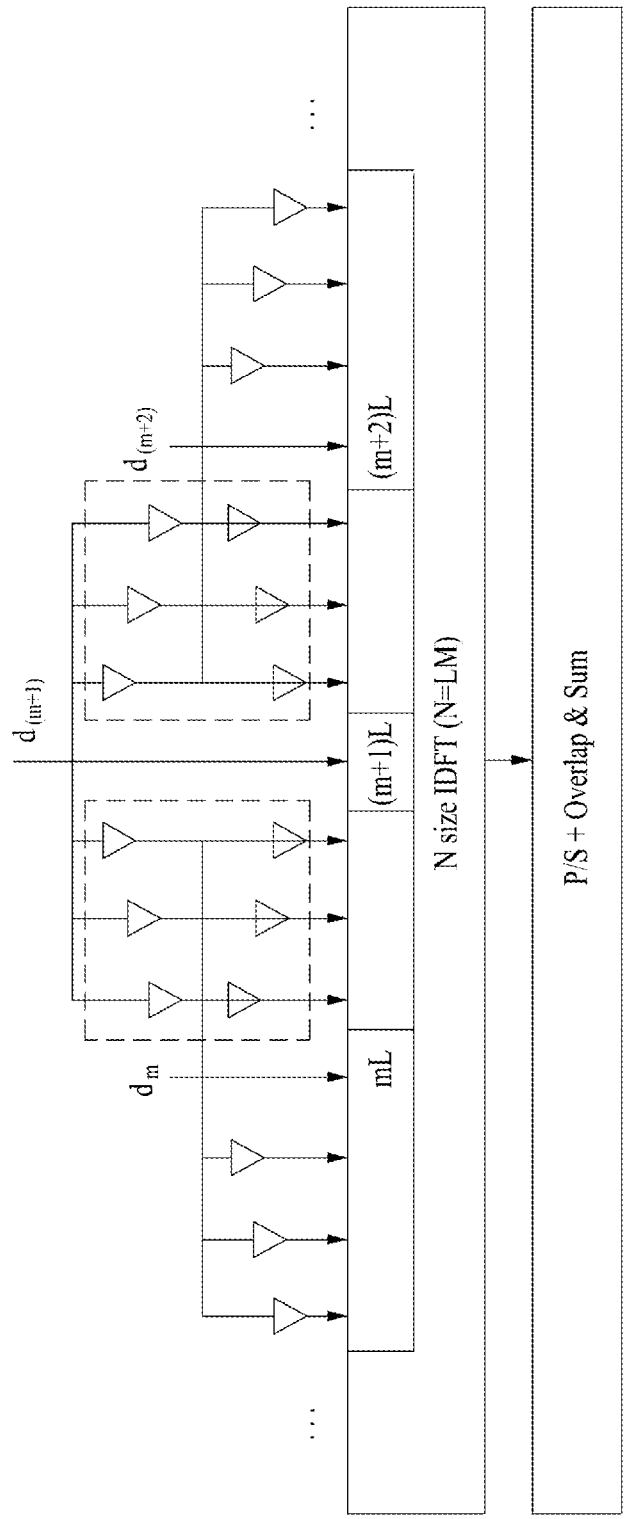
FIG. 1 is a view illustrating a structure of a transmission apparatus of a QAM-FBMC system according to an embodiment.

FIG. 1 is a view illustrating a structure of a transmission apparatus of a QAM-FBMC system according to an embodiment.

Referring to FIG. 1, there is a need to express a QAM-FBMC system in a matrix form to model the QAM-FBMC system into an equivalent end-to-end discrete time system.

A discrete time transmission signal x[n] of the QAM-FBMC system may be expressed as a sum of QAM data symbols $d_m[k]$ like following Equation 1.

$$x[n] = \sum_{k=-\infty}^{\infty} \sum_{m=0}^{M-1} d_m[k] p_m[n - kM] \quad \text{[Equation 1]}$$

In Equation 1, $d_m[k]$ represents the m-th sub-carrier in the k-th symbol, M represents the number of sub-carriers, and $p_m[n]$ represents a time domain filter coefficient for the m-th sub-carrier. In addition, a frequency domain coefficient may be multiplied by data symbol sub-carriers up-sampled as shown in FIG. 1 L times.

In this case, the k-th transmission symbol vector x[k] may be expressed as following Equation 2.

$$x[k] = W_N^H P_f d[k] \quad \text{[Equation 2]}$$

In Equation 2, d[k] represents a data symbol vector (M×1), $P_f$ represents a frequency domain filter coefficient matrix (N×M), and $W_N$ represents an N point DFT matrix (N×N), where n=LM represents a FFT size and L represent an overlapping factor.

Based on the following reference [1]: C. Kim, K Kim, Y. H. Yun, Z. Ho, B. Lee, and J.-Y. Seol, "*QAMFBMC: A new multi-carrier system for post-ofdm wireless communications,*" in 2015 IEEE Global Communications Conference (GLOBECOM). IEEE, 2015, pp. 1-6, the k-th receiving signal (k=0) may be defined as following Equation 3 through overlap & sum that is a QAM-FBMC property.

$$y[0] = \sum_{l=-L}^{L-1} T[l] H[l] W_N^H P_f d[l] + w[0] \quad \text{[Equation 3]}$$

In Equation 3, w represents additive white Gaussian noise (AWGN) with zero mean and dispersion $\sigma^2$, and H [l] that is a channel matrix represents a Toeplitz matrix having a size of (N+M)×N in a time domain, where the n-th column of the Toeplitz matrix H may be defined as following Equation 4.

$$[H](:,n) = \text{circshift}\{[h_0 h_1 \ldots h_{L_c-1} 0_{N+M-L_c}]^T, n-1\} \quad \text{[Equation 4]}$$

In Equation 4, $L_c$ represents a length of a time domain channel tap. In addition, a shift-and-slice matrix T [l] having a size of N×(N+M) based on the reference [1] described above may be expressed as following Equation 5.

$$T[l] = \begin{cases} \begin{bmatrix} 0 & I_{N+M+lM} \\ 0 & 0 \end{bmatrix}, & l < 0 \\ [I_N \ 0], & l = 0 \\ \begin{bmatrix} 0 & 0 \\ I_{N-lM} & 0 \end{bmatrix}, & l > 0 \end{cases} \quad \text{[Equation 5]}$$

In Equation 5, the matrix T {l} represents interference of symbols from adjacent symbols to the zero-th symbol. The preceding symbols of (L−1) and the succeeding symbols of (L−1) may overlap each other and be summed up due to the FBMC structure, and then, may be received. The succeeding symbols may represent symbols successively and sequentially symbols together with the preceding symbols. Thus, the channel tail exerts an influence on the L-th preceding symbol so that interference may occur.

Then, a process of detecting the k-th (k=0) received symbol based on the decision feedback equalizer (DFE) may be rewritten as following Equation 6.

$$\tilde{d}[0] = P_f^H G_{eq}[0] W_N y[0] \quad \text{[Equation 6]}$$

$$= P_f^H G_{eq}[0] W_N \sum_{l=-L}^{L-1} T[l] H[l] W_N^H P_f d[l] + \hat{w}[0]$$

In Equation 6, $G_{eq}$ represents an up-sampled frequency domain equalizer, and $\hat{w}[0]$ represents noise after equalizing and filtering.

To obtain a system transfer function, that is, a system matrix R(z), the input/output relation between a data symbol d[k] and a detected symbol $\tilde{d}$[k] may be simplified and generalized as following Equation 7.

$$\tilde{d}[k] = d[k] + \sum_{l=-L}^{L-1} J[l] d[k+l] + \hat{w}[k] \quad \text{[Equation 7]}$$

In Equation 7, the l-th interference matrix J [l] may be defined as following Equation 8.

$$J[l \neq 0] = P_f^H G_{eq}[l] W_N T[l] H[l] W_N^H P_f$$

$$J[0] = P_f^H G_{eq}[0] W_N T[0] H[0] W_N^H P_f - I_M \quad \text{[Equation 8]}$$

In Equation 8, the interference matrix J [l] represents interference caused by the l-th preceding data symbols or succeeding data symbols. Then, by disregarding noise in Equation 8 and z-transforming Equation 8, the relation between the transmission vector polynomial d(z) and reception vector polynomial $\tilde{d}$(z) may be rewritten as following Equation 9.

$$\tilde{d}[z] = \sum_{l=-L}^{L-1} (I_M + J[l]z^l) d(z) \quad \text{[Equation 9]}$$

$$R(z) = \sum_{l=-L}^{L-1} (I_M + J[l]z^l)$$

The system transfer function R(z) of Equation 9, $R(z) = \ldots + J^H[2]z^{-2} + J^H[1]z^{-1} + (I_m + J[0]) + J[1]z^1 + J[2]z^2 + \ldots$, may be modeled from an equivalent end-to-end discrete system matrix into a polynomial matrix. That is, the equivalent end-to-end discrete system matrix R(z) may be modeled to include all of QAM-FBMC modulation, channel, equalizing and QAM-FBMC demodulation, and residual interference may be removed based on a pre-coding filter, a feed forward filter and a feedback filter calculated by factorizing R(z).

Figure 2:
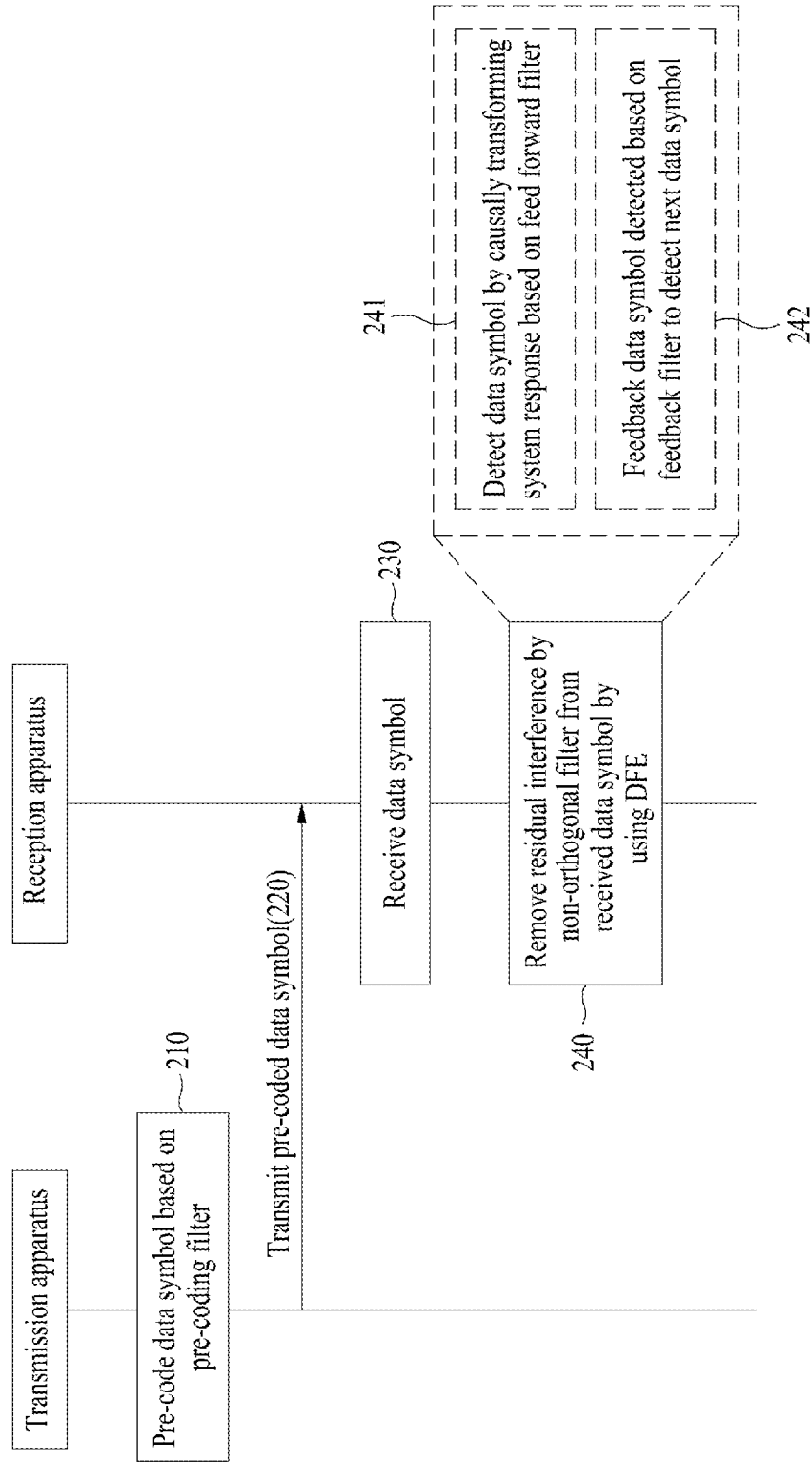
FIG. 2 is a signaling diagram illustrating an operation of removing residual interference of a filter in a QAM-FBMC system according to an embodiment.
Figure 3:
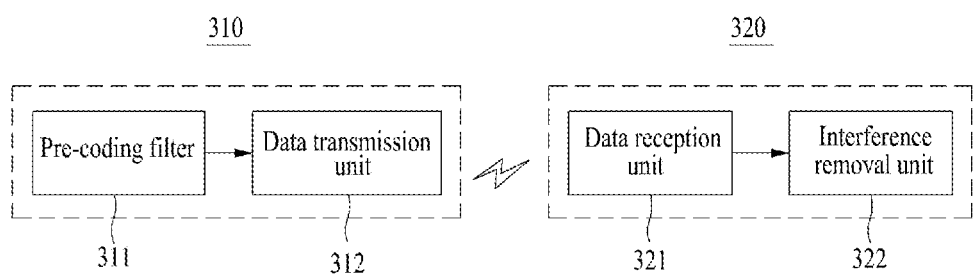
FIG. 3 is a block diagram illustrating the internal configuration of a QAM-FBMC system according to an embodiment.

FIG. 2 is a signaling diagram illustrating an operation of removing residual interference of a filter in a QAM-FBMC system according to an embodiment. FIG. 3 is a block diagram illustrating the internal configuration of a QAM-FBMC system according to an embodiment.

The steps 210 to 240 of FIG. 2 may be performed by elements of FIG. 3 including a per-coding filter 311, a data transmission unit 312, a data reception unit 321 and an interference removal unit 322, respectively.

In step 210, a transmission apparatus 310 of a QAM-FBMC system may pre-code a data symbol to be transmitted to a reception apparatus 320 paired with the transmission apparatus 310, based on the pre-coding filter 311. In this case, the pre-coding filter 311 may be calculated through spectral factorization and perform the pre-coding for aligning delays of the data symbols received at the reception apparatus 320.

In step 220, the data transmission unit 312 may transmit the pre-coded data symbol to the reception apparatus 320.

In step 230, the data reception unit 321 may receive the data symbol transmitted from the transmission apparatus 310.

In step 240, the interference removal unit 322 may remove or reduce residual interference caused by a non-orthogonal filter from the received data symbol by using the DFE. In this case, the interference removal unit 322 may remove the residual interference based on a feed forward filter and a feedback filter calculated through spectral factorization.

In step 241, the interference removal unit 322 may transform a non-causal system response into a causal system response based on the feed forward filter. Thus, as the non-causal system response is transformed into the causal system response, the data symbols may be successively detected without any errors. That is, the interference may be removed.

In step 242, the interference removal unit 322 feeds the data symbols, which are successively detected based on the feedback filter, back to an output terminal of the feed forward filter, such that the feedback symbols may be used for next symbol detection. Thus, the interference removal unit 322 may repeat the process of detect a next data symbol by feeding the data symbols successively detected through the feed forward filter back to the feed forward filter through the feedback filter, such that all received data symbols transmitted from the transmission apparatus 310 may be detected.

Hereinafter, referring to FIG. 4, the operations of calculating each filter for removing interference through spectral factorization and removing residual interference by using each filter (the pre-coding filter, feed forward filter and feedback filter) will be described in detail.

Figure 4:
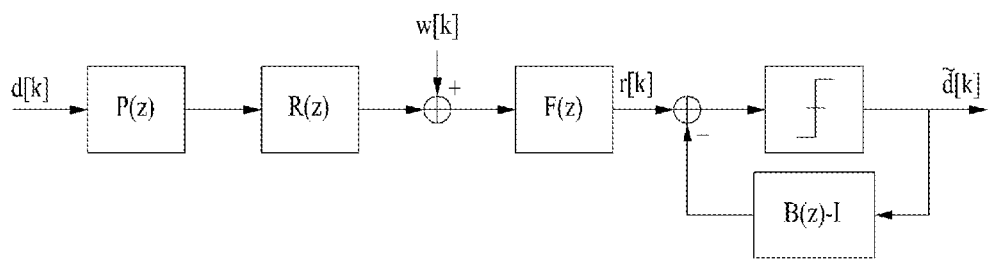
FIG. 4 is a block diagram illustrating a decision feedback equalizer (DFE) including a pre-coding filter according to an embodiment.

FIG. 4 is a block diagram illustrating a decision feedback equalizer (DFE) including a pre-coding filter according to an embodiment.

Referring to FIG. 4, the QAM-FBMC system may use the pre-coding filter P(z), the feed forward filter F(z) and the feedback filter B(z) to reduce or remove the residual interference of a filter, and may calculate the filters P(z), F(z) and B(x) based on a system matrix R(z) representing a system transfer function in a matrix form and spectral factorization. In this case, the feed forward filter F(z) may be used to transform the non-causal system response into the causal system response to perform sequential feedback detection. That is, the feed forward filter F(z) may be used to casually transform the system response to successively detect the data symbols.

As shown in FIG. 4, the pre-coding filter may be added to the data symbol d[k] to align the delays of the received vectors. The feed forward filter may be successively detect the data symbols for each time k by causally transform an output response. The detected data symbols may be fed back to the output terminal of the feed forward filter through the feedback filter again, and then, the feedback data symbol may be subtracted from a next data symbol, such that the original data symbols are detected.

In this case, the feed forward filter F(z) may be calculated by decomposing the system transfer function having spectral factorization based on following Equation 10.

$$R(z)=\Gamma^H(z^{-*})\Sigma^2\Gamma(z) \quad \text{[Equation 10]}$$

In Equation 10, $\Sigma$ represents a real part diagonal matrix of M×M and is causal since $\Gamma(z)=\Sigma_{k\geq 0}\Gamma_k z^{-k}$. Then, the feed forward filter and the feedback filter may be expressed through spectral factorization as following Equation 11.

$$F(z)=\Sigma^{-2}\Gamma^{-H}(z^{-*}),\ B(z)=\Gamma(z) \quad \text{[Equation 11]}$$

Due to an alignment problem between hub carrier data symbols, the feed forward filter and the feedback filter of Equation 11 may be corrected to have the pre-coding filter as shown in FIG. 4. The operation of correcting the feed forward filter and the feedback filter such that the feed forward filter and the feedback filter have the pre-coding filter will be described below with reference to Equation 18.

Referring to Equation 9 again, the system transfer function R(z) may be modeled in a polynomial matrix form. That is, since $J[l]=J[-l]^H$, the system transfer function R(z) may have a para-hermitian matrix polynomial property and due to such a property, the system transfer function R(z) may be expressed as following Equation 12.

$$R(z)=R^H(z^{-*}) \quad \text{[Equation 12]}$$

The interference removal unit 322 may decompose the system matrix R(z) based on polynomial eigenvalue decomposition (PEVD). A multi-channel matrix may be decomposed into single channel matrices through the decomposition as following Equation 13. That is, the system matrix R(z) may be decomposed into a diagonal matrix and a unitary matrix.

For example, based on a second order sequential best rotation (SBR2) algorithm, the system matrix R(z) may be diagonalized, wherein the SBR2 algorithm may be based on Reference 2: *J. G. McWhirter, P. D. Baxter, T. Cooper, S. Redif, and J. Foster, "An EVD algorithm for para-hermitian polynomial matrices," Signal Processing, IEEE Transactions on*, vol. 55, no. 5, pp. 2158-2169, 2007.

$$R(z)=S^H(z^{-*})D(z)S(z) \quad \text{[Equation 13]}$$

In Equation 13, S(z) represents a para-unitary matrix and expressed as $S^H(z^{-*})S(z)=S(z)S^H(z^{-*})=I_M$, and D(z) represents a diagonal matrix.

Then, the interference removal unit 322 may perform single channel spectral factorization for each element of the diagonal matrix D(z). Since the polynomial matrix is more easily factorized than the scalar polynomial, the single channel spectral factorization of D(z) may be expressed as following Equation 14.

$$D(Z)=E^H(z^{-1})E(z)=E(z)E^H(z^{-1}) \quad \text{[Equation 14]}$$

The i-th diagonal element $d^{(i)}(z)$ of the diagonal matrix D(z) may be expressed as following Equation 15.

$$d^{(i)}(z)=e^{(i)}(z^{-1})e^{(i)}(z)=e^{(i)}(z)e^{(i)}(z^{-1}) \quad \text{[Equation 15]}$$

In Equation 15, since $e^{(i)}(z)=\Sigma_{k\geq 0}e_k z^{-k}$ and $E(z)=\Sigma_{k\geq 0}E_k z^{-k}$, E(z) may become a causal polynomial. Thus, Equation 15 may be rewritten as following Equation 16.

$$R(z) = S^H(z^{-*})E^H(z^{-1})E(z)S(z) \quad \text{[Equation 16]}$$
$$= S^H(z^{-*})\tilde{E}^H(z^{-1})\Sigma^2\tilde{E}(z)S(z)$$

Since $E=E_0$, we may have $$\tilde{E}(z)=E_0^{-1}E(z)=I_M+\Sigma_{k\geq 1}\tilde{E}_k z^{-k}$$

Then, in order to make $Z^0$ to be an identity matrix, $Z^0$ may be divided by E to be normalized. In this case, since $\Gamma(z)=\tilde{E}(z)S(z)$, when Equation 10 is rewritten, the system matrix R(z) may be expressed as following Equation 17.

$$R(z) = S^H(z^{-*})\tilde{E}^H(z^{-1})\Sigma^2\tilde{E}(z)S(z) \quad \text{[Equation 17]}$$
$$= \Gamma^H(z^{-*})\Sigma^2\Gamma(z)$$

Since the system response of the QAM-FBMC system, which passes through the pre-coding filter P(z) in the transmission apparatus 310 and the feed forward filter F(z) in the reception apparatus 320, allows $Z^0$ to be an identity matrix and a causal polynomial $\tilde{E}(z)$, such that residual interference is removed, an inverse matrix of the left part of $\tilde{E}(z)$ may be calculated as the feed forward filter F(z) and an inverse matrix of the right part may be calculated as the pre-coding filter P(z).

That is, the pre-coding filter and the feed forward filter may be calculated based on Equation 17 obtained by spectrally factorizing the system matrix R(z) as following Equation 18.

$$F(z) = [S^H(z^{-*})\tilde{E}^H(z^{-1})\Sigma^2]^{-1} \quad \text{[Equation 18]}$$
$$= \Sigma^{-2}\tilde{E}^{-H}(z^{-1})S(z)$$
$$p(z) = [S(z)]^{-1}$$
$$= S^H(z^{-*})$$

Thus, based on the pre-coding filter, the feed forward filter and the feedback filter including the pre-coding filter expressed as Equation 18, the system response input to the detector may be rewritten as following Equation 19.

$$F(z)R(z)P(z) = \Sigma^{-2}\Gamma^{-H}(z^{-*})\Gamma^{H}(z^{-*})\Sigma^{2}\Gamma(z)S^{H}(z^{-*}) \quad \text{[Equation 19]}$$
$$= \tilde{E}(z)$$

Meanwhile, in case of the feedback filter B(z) defined as Equation 11, because the elements may have mutually different delays, it may be difficult to detect data symbols. Thus, the feedback filter defined as Equation 11 may be corrected based on Equation 19 as following Equation 20.

$$B(z) = \tilde{E}(z) \quad \text{[Equation 20]}$$

Following Table 1 illustrates a prototype of a non-orthogonal filter for simulating filter performance in the QAM-FBMC system.

TABLE 1

|  | Type 0 | Type 1 | Type 2 |
| --- | --- | --- | --- |
| Filter | PHYDYAS [4] | Type 1 [6] | Type 2 [6] |
| Taps | 4 | 4 | 15 |
| Self-SIR | 7.52 dB | 10.6 dB | 19.4 dB |
| Coefficient | Real | Complex | Complex |

In Table 1, the self-SIR represents a ratio of signal power to an interference component caused by the non-orthogonality of the filter. The greater the SIR value is, the better the orthogonality of the filter is, so that the performance of the filter may be excellent. In addition, simulation parameters may be defined as following Table 2.

TABLE 2

AWGN channel is used
Number of sub-carriers: M = 64
Overlapping factor: L = 4
QPSK/16QAM modulation
PEVD algorithm: SBR2 algorithm
SBR2 parameter: 100 iteration, ε = 1e$^{-3}$, μ = 1e$^{-3}$
Scalar spectral factorization algorithm: FFT-based spectral factorization
Polynomial inverse algorithm: Taylor series expansion (step size = 10)

Figure 5:
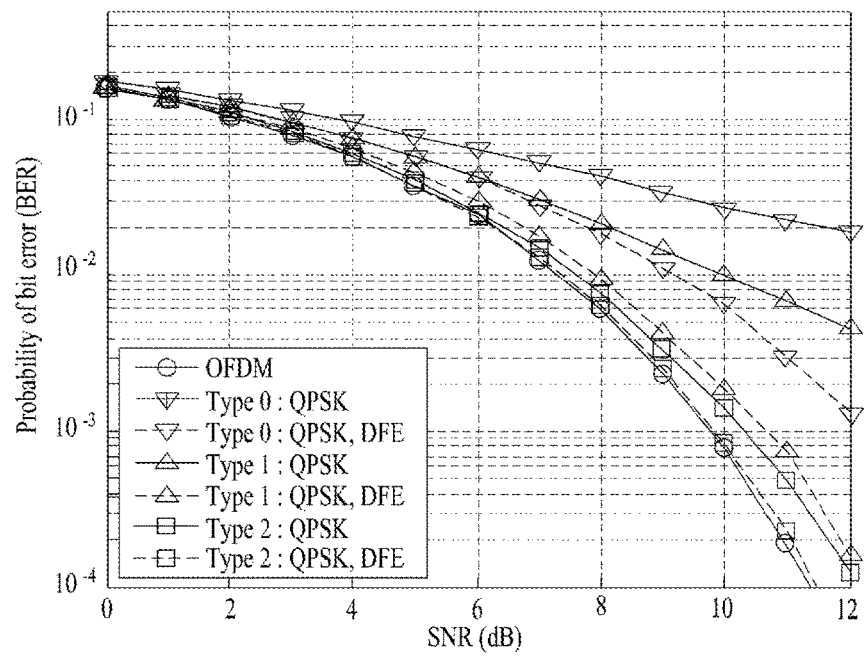
FIG. 5 is a view illustrating the BER performance of a QAM-FBMC according to an embodiment by comparing QPSK and 16QAM with each other.
Figure 5:
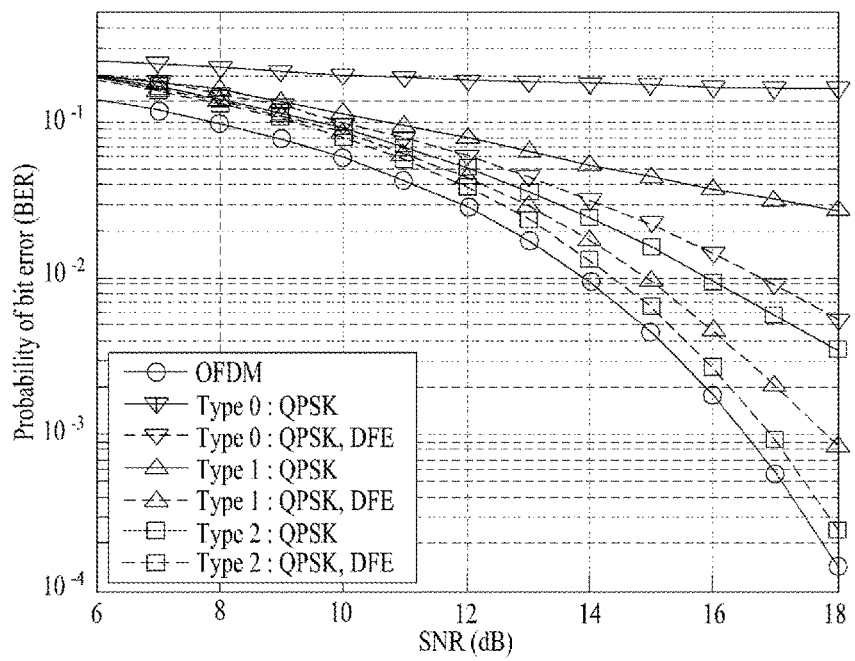

FIG. 5 is a view illustrating the BER performance of a QAM-FBMC according to an embodiment by comparing QPSK and 16QAM with each other.

FIG. 5 shows the BER performance 510 in case of using QPSK and the BER performance 520 in case of using 16QAM.

As shown in FIG. 5, in case of a type 2 filter having a high self-SIR, all the interference components is removed by the DFE, so that it may be confirmed that the performance is almost equal to OFDM performance.

In case of a type 0 or 1 filter having a low self-SIR, although the DFE does not remove all interference, the DFE considerably removes interference so that it may be confirmed that the BER performance is considerably improved.

As described above, since there is a trade-off between the filter orthogonality and the frequency limitation property and it is impossible to perfectly meet the two properties, the QAM-FBMC system uses a non-orthogonal (near-orthogonal) filter, so that interference is caused due to using of the non-orthogonal filter, thereby deteriorating the BER performance. However, as shown in FIG. 5, the QAM-FBMC system according to the inventive concept detects a data symbol by using the pre-coding and DFE, so that the residual interference due to the non-orthogonal filter is removed perfectly or almost, thereby improving the BER performance to be approximate to the OFDM performance. In this case, each component of the pre-coding filter and the feed forward filter and feedback filter of the DFE may be calculated through spectral factorization. Thus, the QAM-FMBC system including the pre-coding filter and the feed forward filter and feedback filter of the DFE may have a good frequency limitation property, may enable a flexible waveform design and may be applied to high-level signal processing such as MIMO.

The methods according to embodiments may be implemented in the form of program instruction executable through various computer systems and may be recorded on a computer-readable recording medium. The computer-readable medium may also include program instructions, data files, data structures, and the like independently or in the form of combination. The program instructions recorded in the medium may be those specially designed and constructed for the embodiment or may be well-known and available to those skilled in the computer software arts. Examples of the computer-readable medium may include magnetic media such as hard disks, floppy disks, and magnetic tape; optical media such as CD ROM disks and DVD; magneto-optical media such as floptical disks; and hardware devices that are specialized to store and perform program instructions, such as read-only memory (ROM), random access memory (RAM), flash memory, and the like. Examples of program instructions may include both machine code produced by a compiler and high-level code executed by the computer using an interpreter. The described hardware devices may be configured to operate as one or more software modules to perform the operations of the above-described embodiments, and vice versa.

Although being described with reference to specific examples and drawings, modifications, additions and substitutions on embodiments may be variously made according to the description by those of ordinary skill in the art. For example, suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

According to the embodiments, based on spectral factorization and a decision feedback equalizer, the residual interference caused by a non-orthogonal filter (or approximate to orthogonality) in a QAM-FBMC system may be reduced or removed.

In addition, the residual interference of a filter may be reduced or removed by calculating the pre-coding filter for removing the residual interference through spectral factorization.

What is claimed is:

1. A method of controlling interference, which is performed by a reception apparatus of a quadrature amplitude modulation-filter bank multi-carrier (QAM-FBMC) system, wherein the reception apparatus is paired with a transmission apparatus, the method comprising:
    receiving a pre-coded data symbol; and
    removing residual interference from the received pre-coded data symbol by using a decision feedback equalizer, the residual interference which is caused due to a non-orthogonal filter in the transmission apparatus.

2. The method of claim 1, wherein the removing of the residual interference comprises:

removing the residual interference from the pre-coded data symbol based on a feed-forward filter calculated through spectral factorization.

3. The method of claim 2, wherein the removing of the residual interference comprises:
performing sequential feedback detection such that a system response is causally transformed as the received data symbol passes through the feed-forward filter.

4. The method of claim 2, wherein the feed-forward filter is calculated by decomposing a system matrix (R(z)), which is obtained by modeling a relation between a transmission vector and a reception vector of the data symbol into a matrix polynomial in z domain, into a unitary matrix and a diagonal matrix, and spectrally factorizing the diagonal matrix.

5. The method of claim 4, wherein the system matrix comprises a para-hermitian matrix property.

6. The method of claim 1, wherein the removing of the residual interference comprises:
feeding back the detected data symbol to an output terminal of a feed-forward filter based on a feedback filter calculated through spectral factorization; and
removing the residual interference from the received data symbol based on the feed-backed data symbol.

7. The method of claim 1, wherein the pre-coded data symbol is obtained by precoding a data symbol based on a precoding filter calculated through spectral factorization and delay-aligned through the receiving of the pre-coded data symbol.

8. A quadrature amplitude modulation-filter bank multi-carrier (QAM-FBMC) system comprising:
a data reception unit configured to receive a pre-coded data symbol from a transmission apparatus; and
an interference removal unit configured to remove residual interference from the received pre-coded data symbol by using a decision feedback equalizer, the residual interference which is caused due to a non-orthogonal filter in the transmission apparatus.

9. The QAM-FBMC system of claim 8, wherein the interference removal unit removes the residual interference from the pre-coded data symbol based on a feed-forward filter calculated through spectral factorization.

10. The QAM-FBMC system of claim 9, wherein the feed-forward filter is calculated by decomposing a system matrix (R(z)), which is obtained by modeling a relation between a transmission vector and a reception vector of the data symbol into a matrix polynomial in z domain, into a unitary matrix and a diagonal matrix, and spectrally factorizing the diagonal matrix.

11. The QAM-FBMC system of claim 10, wherein the system matrix comprises a para-hermitian matrix property.

12. The QAM-FBMC system of claim 8, wherein the interference removal unit feedbacks the detected data symbol to an output terminal of a feed-forward filter based on a feedback filter calculated through spectral factorization, and removes the residual interference from the received data symbol based on the feed-backed data symbol.

13. The QAM-FBMC system of claim 8, wherein the pre-coded data symbol is obtained by precoding a data symbol based on a precoding filter calculated through spectral factorization and delay-aligned through the receiving of the pre-coded data symbol.

14. A method of controlling interference, which is performed by a reception apparatus of a quadrature amplitude modulation-filter bank multi-carrier (QAM-FBMC) system, wherein the reception apparatus is paired with a transmission apparatus, the method comprising:
pre-coding a data symbol based on a feed-forward filter calculated through spectral factorization; and
transmitting the pre-coded data symbol to the reception apparatus, wherein a system matrix having a para-hermitian matrix property is applied to the pre-coded data symbol at the reception apparatus, wherein the system matrix is obtained by modeling a relation between a transmission vector and a reception vector of the data symbol.

15. The method of claim 14, wherein the pre-coding filter is calculated by decomposing the system matrix into a unitary matrix and a diagonal matrix and spectrally factorizing the diagonal matrix.

16. The method of claim 14, wherein filter residual interference is a property of QAM-FBMC, is generated as the data symbols overlap each other, and is removed based on a pre-coding filter, a feed-forward filter and a feed-back filter which are calculated through the spectral factorization.

* * * * *